United States Patent
Kashiwai et al.

(10) Patent No.: US 6,663,190 B2
(45) Date of Patent: Dec. 16, 2003

(54) BALANCE ADJUSTED WHEEL

(75) Inventors: Mikio Kashiwai, Saitama (JP); Shiro Sato, Saitama (JP); Hisamitsu Takagi, Saitama (JP); Shinichi Watanabe, Saitama (JP); Hidemi Ichinose, Mie (JP); Mitsuru Yokoyama, Okayama (JP)

(73) Assignees: Honda Giken Kogyo Kabushiki Kaisha, Tokyo (JP); Ring Techs Co., LTD, Kurashiki (JP)

( * ) Notice: Subject to any disclaimer, the term of this patent is extended or adjusted under 35 U.S.C. 154(b) by 0 days.

(21) Appl. No.: 10/001,999

(22) Filed: Dec. 5, 2001

(65) Prior Publication Data

US 2002/0067066 A1 Jun. 6, 2002

(30) Foreign Application Priority Data

Dec. 5, 2000 (JP) ........................................ 2000-369401

(51) Int. Cl.⁷ .............................. B60B 3/10; B60B 1/00; B21D 53/26; B23P 17/00
(52) U.S. Cl. ................................. 301/63.101; 301/5.21; 301/63.107; 29/894.32; 29/894.325
(58) Field of Search ...................... 301/5.21, 63.101 I, 301/63.103, 63.107, 5.24; 29/894.3, 894.32, 894.322, 894.323, 894.325; 73/66, 458, 468; 74/573 R; 72/199, 203; 152/418, 427

(56) References Cited

U.S. PATENT DOCUMENTS

| | | | | | |
|---|---|---|---|---|---|
| 1,533,438 A | * | 4/1925 | Main | ..................... | 301/63.101 |
| 1,638,646 A | * | 8/1927 | Schoenthal | ............ | 301/35.632 |
| 1,812,437 A | * | 6/1931 | Hunt | ..................... | 301/63.108 |
| 1,847,774 A | * | 3/1932 | Main et al. | ................. | 301/5.21 |
| 2,133,144 A | * | 10/1938 | Johnson | ................. | 29/894.325 |
| 2,307,335 A | * | 1/1943 | Reddick | ................ | 29/894.344 |
| 2,584,309 A | * | 2/1952 | Voorhees | ............... | 301/63.101 |
| 3,155,429 A | * | 11/1964 | Metzler | ..................... | 301/36.1 |
| 3,222,765 A | * | 12/1965 | Parent et al. | .......... | 29/894.323 |
| 3,808,660 A | * | 5/1974 | Wik | .......................... | 29/894.3 |
| 4,106,543 A | * | 8/1978 | Sano | .......................... | 152/405 |
| 4,302,966 A | * | 12/1981 | Ohnishi et al. | ................. | 73/66 |
| 4,646,434 A | * | 3/1987 | Daudi | ......................... | 29/802 |
| 5,313,997 A | * | 5/1994 | Bias | ........................... | 152/427 |
| 5,647,642 A | * | 7/1997 | Word | ........................ | 301/5.21 |
| 6,189,372 B1 | * | 2/2001 | Danz | .............................. | 73/66 |
| 6,286,195 B1 | * | 9/2001 | Takahashi | .................. | 29/407.1 |

* cited by examiner

Primary Examiner—S. Joseph Morano
Assistant Examiner—Jason R. Bellinger
(74) Attorney, Agent, or Firm—Armstrong, Kratz, Quintos, Hanson & Brooks, LLP

(57) ABSTRACT

For balancing a wheel, which is formed of a rolled plate having varying thickness, the wheel is provided with a disk which is formed by a rolled plate having varying thickness in the rolling direction, wherein wheel balance is adjusted by radially adjusting the angle between the location of the thick part of the disk and the location of the air valve insertion hole, and the location of the air valve insertion hole certainly accords with the heaviest point by conforming the location of the air valve insertion hole with the location of the thick part of the disk.

11 Claims, 5 Drawing Sheets

(a)

(b)

(a)

(b)

BALANCE ADJUSTED WHEEL

BACKGROUND OF THE INVENTION

1. Field of the Invention

The present invention relates to a static balance-adjusted wheel for a vehicle, and the like; a method for manufacturing a static balance-adjusted wheel; and a method for adjusting the balance of the wheel.

2. Prior Art

With wheels (tire/wheel assemblies) for vehicles, and the like, balance in the circumferential direction of the rotation axis and in the direction of the rotation axis must be adjusted when the tire and wheel are assembled together.

The condition in which balance in the direction about the circumference of the rotation axis is not adjusted is called static unbalance, which causes vibration of the vehicle body in the vertical direction. The condition in which balance in the direction along the rotation axis is not adjusted is called dynamic unbalance, which causes vibration of the vehicle body in the vertical and lateral directions, as well as steering shimmy.

A method described below has been used conventionally for adjusting the balance of the tire/wheel assembly. With the conventional method, a wheel and a tire are assembled by aligning the direction of the radial force variation (RFV), which is strongest in the radial direction of a tire, with the direction of the low point, which is at the location of the smallest diameter in the peripheral direction of the wheel. When the lightest point along the periphery of a tire, does not align with the heaviest point therealong, balance weights must be attached to the wheel onto which a tire is assembled for balancing the tire/wheel assembly.

For determining a location at which the balance weight is attached, the direction and amount of the unbalance of tire/wheel assembly is measured by an unbalance-measuring instrument. Depending on the measurement result, a balance weight, which will match an unbalanced direction and an unbalanced amount of assembled tire/wheel assembly, is chosen, and attached to the periphery of the wheel side face. Then, the balance of a tire/wheel assembly is adjusted by repeating the positioning of the balance weight and measurement of the unbalanced amount of a tire/wheel assembly until the unbalanced amount of the tire/wheel assembly becomes lower than a predetermined value.

For this balance adjusting operation, many processes and complicated works are needed, so that a great number of processes are thus required for this balance adjusting operation. Furthermore, when a balance weight is attached to the outer surface of the wheel, the appearance of the wheel will be spoiled. Therefore, it is desirable that the size of the balance weight is as small as possible, and it is more desirable that the balance of the tire/wheel assembly is adjusted without attaching a balance weight. It is further desirable that the location at which a balance weight is attached can be determined without measuring balance even if the balance weight must be attached.

With the wheel, since the heaviest point of the wheel tends to accord with the location of the air valve, when a tire is assembled onto the wheel, the location where the balance weight is attached may be determined using the location of the air valve as a marker. With conventional wheels, however, the heaviest point does not necessarily accord with the location of an air valve. The location of the air valve thus cannot always be used as a marker showing the heaviest point.

SUMMARY OF THE INVENTION

It is therefore an object of the present invention to provide a balance adjustable wheel, and to improve the appearance of such wheel or to improve the assembly efficiency of such wheel and a tire.

In order to overcome above described problems, the peak of thickness, which exists near the center of the width direction of a rolled plate, is identified. Then, by means of the invention, the balance of the wheel can be controlled with ease by combining the deviation of the balance of a disk having a variable thickness with the deviation of the balance caused by the weight of the air valve.

According to the present invention, which attains these and other objects, there is provided a wheel having a disk which is formed by dividing a rolled plate into a plurality of circumferential sections, the wheel being characterized in that an air valve insertion hole is provided at a predetermined angle position on the basis of the location of a thick part of the disk from the center of the disk.

With this invention, when the unbalance caused by the thick part and the. unbalance caused by the air valve are expressed by a vector from the center of the disk, respectively, the heaviest point of the wheel will be located at the position at which these vectors are compounded. Balance of the wheel thus can be adjusted at a desired location by setting the air valve insertion hole, into which the air valve is attached, at the suitable location.

Since the wheel in which unbalance has been produced in the desired direction may be obtained, plural wheels in which unbalancing locations occur can be manufactured. Therefore, when the tire is to be assembled with the wheel, the wheel is selected which has the same angle between the low point location and the heaviest location from the center of wheel as the angle between the RFV location and the lightest point location determined from the center of the tire upon assembly, whereby, unbalance of the tire/wheel assembly is offset by the heaviest point and lightest point. The balance of the tire/wheel assembly can thus be adjusted with minimum effort.

According to another aspect of the present invention, there is provided a wheel having a disk which is formed by dividing a rolled plate into plural circumferential sections, the wheel is characterized in that the location of a thick part of the disk from the center of the disk and the location containing an air valve insertion hole are overlapped.

With this other aspect of the present invention, since the location of the thick part, which tends to become the heaviest point, as viewed from the center of the wheel, and the location of the air valve are overlapped, the location in which the air valve is provided certainly serves as the heaviest point. The assembling operation of the tire/wheel assembly thus can be adjusted with ease by using the location of the air valve as a marker showing the heaviest point.

According to the manufacturing method of the present invention, there is provided a method for manufacturing a wheel in which a rolled plate of varying transverse thickness is used, the method comprising the steps of: forming a disk from a divided part which is obtained by dividing the rolled plate; and engaging the disk to a rim in the condition that an air valve insertion hole on the rim is provided at a position shifted for a predetermined angle from the location of a thick part of the disk measured from the center of the disk.

With the present assembling method, when the unbalance caused by the thick part of the disk and the unbalance caused by the air valve are each expressed by a vector which is extended from the center of the disk, respectively, the wheel in which the heaviest point thereof is positioned in the direction of the vector obtained by combining both vectors can be manufactured. Therefore, a wheel having the desired balance can be manufactured by determining the predetermined angle required for the location of the air valve insertion hole with respect to the thick part of the disk as measured from the center of the disk.

According to another manufacturing method of the present invention, there is provided a method for manufacturing the wheel in which rolled plates of varying transverse thickness are used, the method comprising the step of: forming a disk from a divided part which is obtained by dividing the rolled plate; and attaching the disk to a rim in the condition that the location of a thick part of the disk measured from the center of the disk and the location of an air valve insertion hole are overlapped.

With another assembling method, the air valve can be provided in the region of the thick part, which is the heavy region of the disk, whereby the wheel with the assembled air valve certainly serving as the heaviest point can be manufactured.

According to the method for adjusting the balance of a wheel, there is provided a method for adjusting the balance of a wheel which is formed by fixing a rim to a disk obtained by dividing a rolled plate of varying transverse thickness into a plurality of disks along the rolling direction, the method is characterized in that the rim is fixed to a disk in the condition that an air valve insertion hole on the rim is provided at a position shifted by a predetermined angle from the location of a thick part of the disk measured from the center of the disk.

With the present balance of wheel adjusting method, since the air valve can be provided at the location which is shifted by the amount of a predetermined angle with respect to the thick part location measured from the center of a disk, the heaviest point of the wheel will be positioned in at the location of a vector obtained by combining the vectors extending from the center of the disk representing the unbalance caused by the thick part of the disk and the unbalance caused by the air valve, respectively.

Here, joining may be performed by any method by which the rim and the disk can be joined without damaging the function of the wheel, and various known methods, for example, welding, brazing, bolting, adhesion by adhesive agent, etc., may be used.

DESCRIPTION OF THE PREFERRED EMBODIMENTS

The preferred embodiment of the present invention will now be described by referring to the attached drawings.

Figure 4:
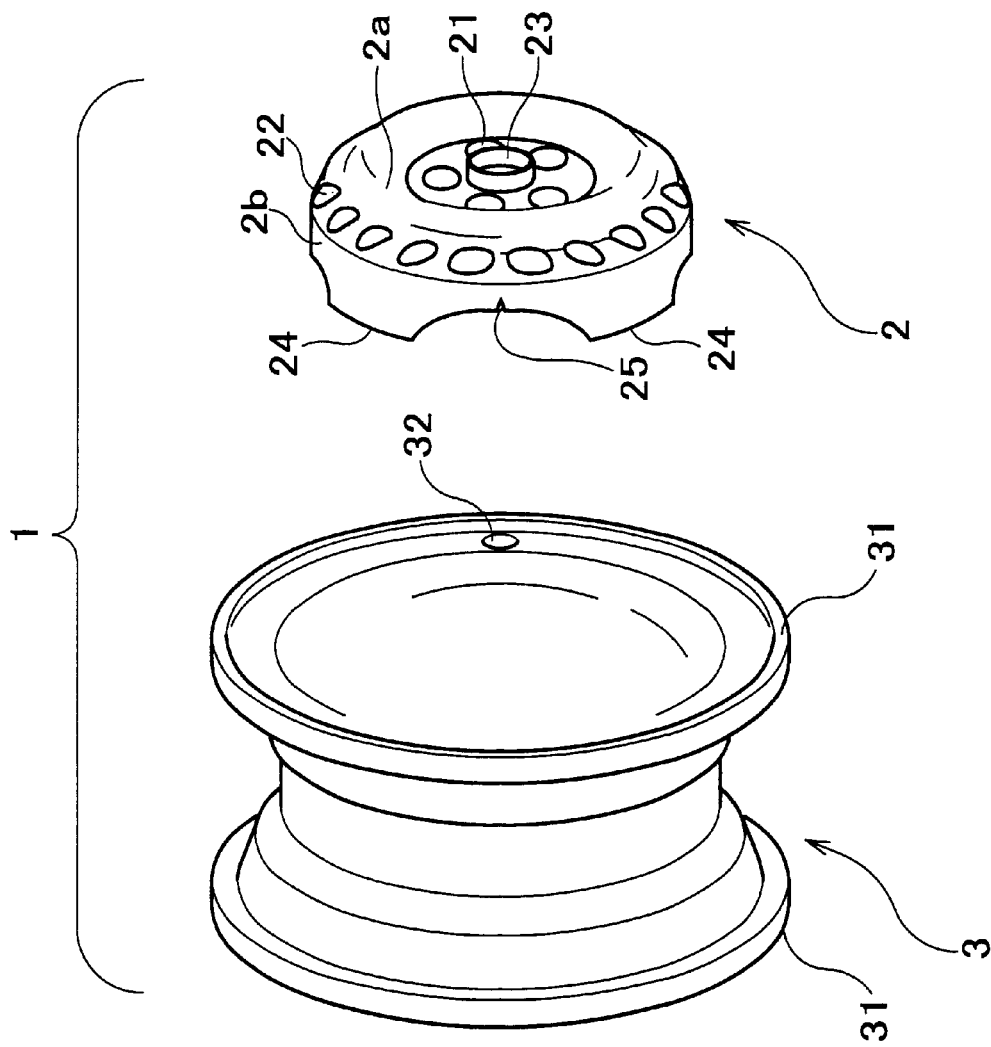
FIG. 4 is an exploded perspective view of a wheel according to the present invention.

The wheel according to the preferred embodiment of the present invention will be explained by referring to FIG. 4. FIG. 4 is an exploded perspective view of a wheel according to the present invention.

As shown in FIG. 4, a wheel 1 is composed of a disk 2, which is bolted onto an unillustrated axle shaft and receives the driving force of the axle shaft, and a rim 3, onto the outer circumference of which a tire is fitted and the inner diameter part of which is welded and bonded to the disk 2.

The disk 2 is made by drawing a rolled steel plate of varying transverse thickness into a cup-like shape, and on the cup-like disk surface 2a is provided with bolt insertion holes 21, through which bolts are inserted when fixing the disk 2 to an axle shaft, a ventilation hole 22 for cooling the brake that is positioned inside the wheel, and a center hole 23, for setting the center of the wheel. At a wall surface part 2b of the cup-like shape, the shape of the raw material punched out from the rolled steel plate is left as it is so that the edge parts are protruded or recessed. The protruding parts among the edge parts of the wall surface part 2b are a weld part 24, which is welded to the rim 3. Since the disk 2 is made of a rolled steel plate, the disk 2 has a thick portion in board thickness and a thin portion in board thickness. The thick portion in board thickness is called a thick part, and it is comparatively heavy. On the other hand, the thin portion in board thickness is called a thin part, and it is comparatively light. With the disk 2, therefore, the unbalance of weight is created by the existence of the thin part and thick part. The difference in the thickness between the thick part and thin part is about 30–50 micrometers at the rolled steel plate which is used as the wheel of the vehicle and whose board has 2.6–3.2 mm in thickness. With the wheel 1 of FIG. 4, a notch 25 is provided in the thinnest part among the edge of the wall-surface part 2b as a marker of the thin part.

The rim 3 has a substantially cylindrical shape and the outer circumferential surface thereof is arranged so that a tire can be mounted thereto. At the edge of the both sides of the rim 3, rim flanges 31 are provided for preventing the mounted tire from falling off. At the part of the rim flange 31 located in the external surface side of the vehicle, an air valve insertion hole 32, into which the air valve for putting air into the tire is inserted, is provided. With the rim 3, the scattering among products is small and the static unbalance amount of the rim 3 is low in spite of a large weight thereof. The side of the air valve insertion hole 32, however, tends to become heavier after assembling because the air valve is inserted into the air valve insertion hole 32. The wheel 1 is formed by welding the weld parts 24 of the disk 2 to the inner diameter parts of the rim 3 after fitting the disk 2 into the inner diameter of the rim 3.

Figure 1:
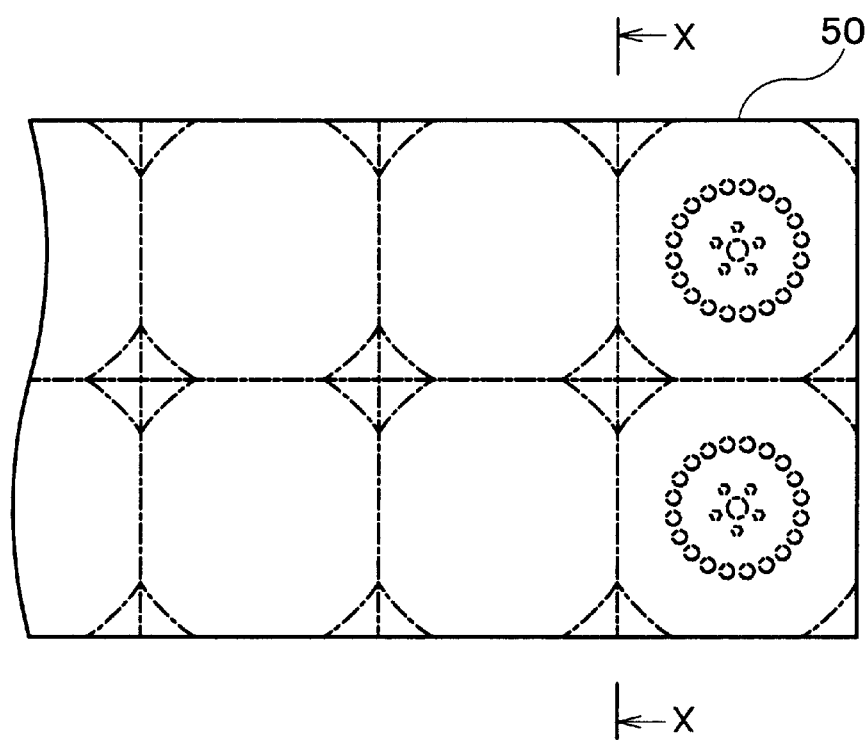
FIG. 1A is a view illustrating the blanking of the wheel from a rolled steel plate.
FIG. 1B is a sectional view taken along line X—X of FIG. 1A.
Figure 1:
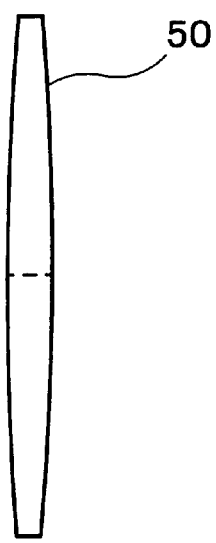

The method for manufacturing the wheel according to the preferred embodiment of the present invention will be explained. FIG. 1A is a view illustrating the blanking of the wheels from the rolled steel plate. FIG. 1B is a sectional view taken along X—X line of FIG. 1A. With the wheel 1 of the present invention, since rolled plates, such as rolled steel plates, are used as the raw material of the disk 2, the property of the rolled plate is employed efficiently. Any known type of rim thus may be used for the rim 3 as long as it can be fitted and bonded to the disk 2.

As shown in FIG. 1A, since the width of a raw rolled steel plate 50 is quite larger than the disk diameter of the wheel 1, two raw disk materials are generally obtained from the width direction of the raw rolled steel plate 50 by blanking. As shown in FIG. 1B, however, since the circumference part of the rolled steel plate tends to be lengthened at the time of rolling, the thickness of the rolled steel plate, near the center of the width direction is thick, and near the edge is thin.

When two raw disk materials are blanked from the raw rolled steel plate of varying transverse thickness in the manner shown in FIG. 1A, the thickness of one side, located near the center of the raw rolled steel plate, is thick and the thickness of the edges of the width dimension of the raw rolled steel plate is thin. The unbalance of weight thus will be created by these variations in thickness. This unbalance has been ignored until now, because it has been thought that there was very little unbalance in the wheel and that the adjustment of the balance of wheel must be done after a wheel is assembled with a tire.

Figure 2:
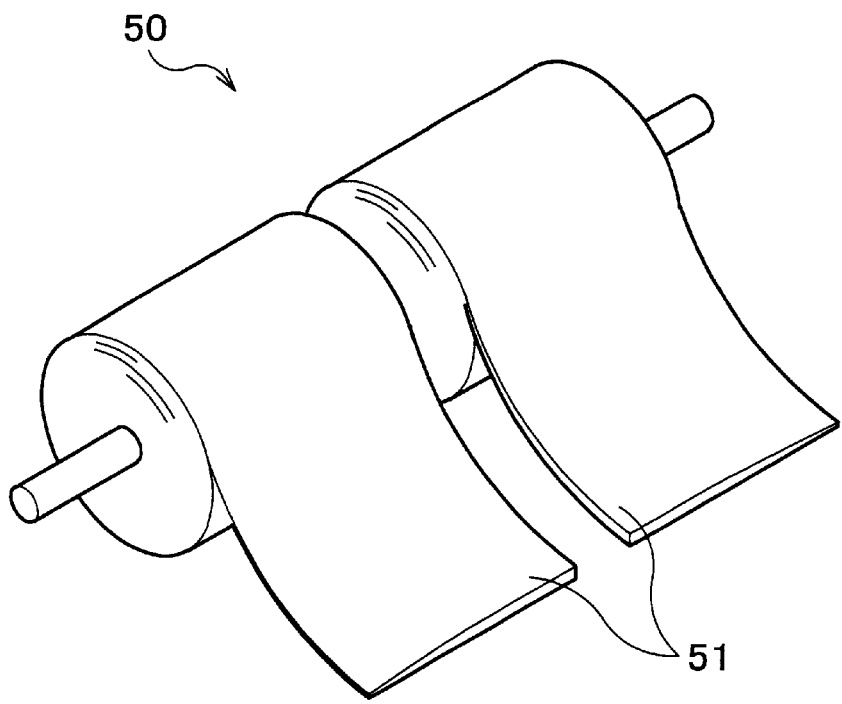
FIG. 2 shows steps in a production process of a wheel according to the preferred embodiment of the present invention.
Figure 2:
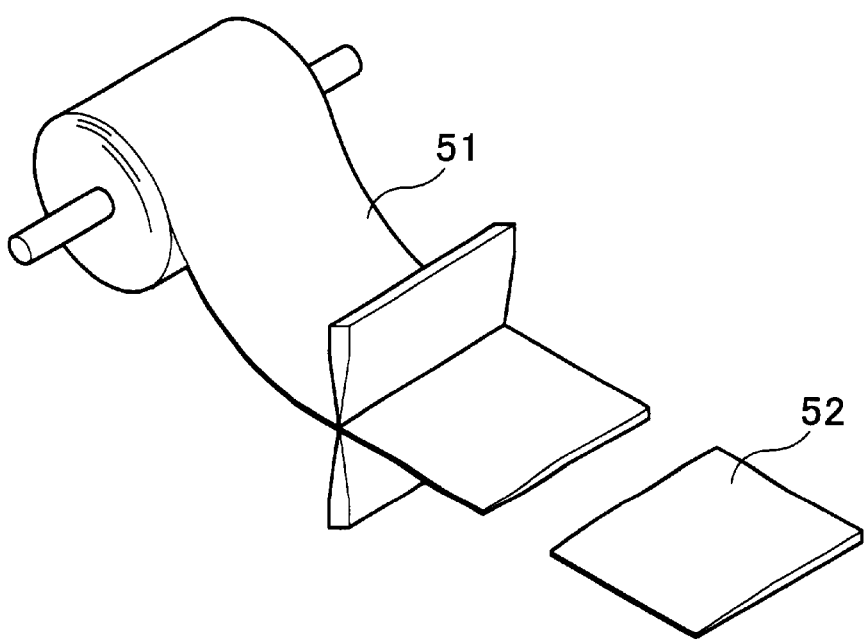

FIG. 2 shows a production process of a wheel according to the present invention. As shown in FIG. 2A, the raw rolled steel plate 50 is divided into several rolls, for example such as rolled steel plate rolls 51 and 51, depending on the size of the disk to be blanked as a raw material.

As shown in FIG. 2B, the blank 52 having a practically square shape is obtained by cutting the rolled steel plate roll 51 according to the size of the raw material of the disk 2.

Figure 3:
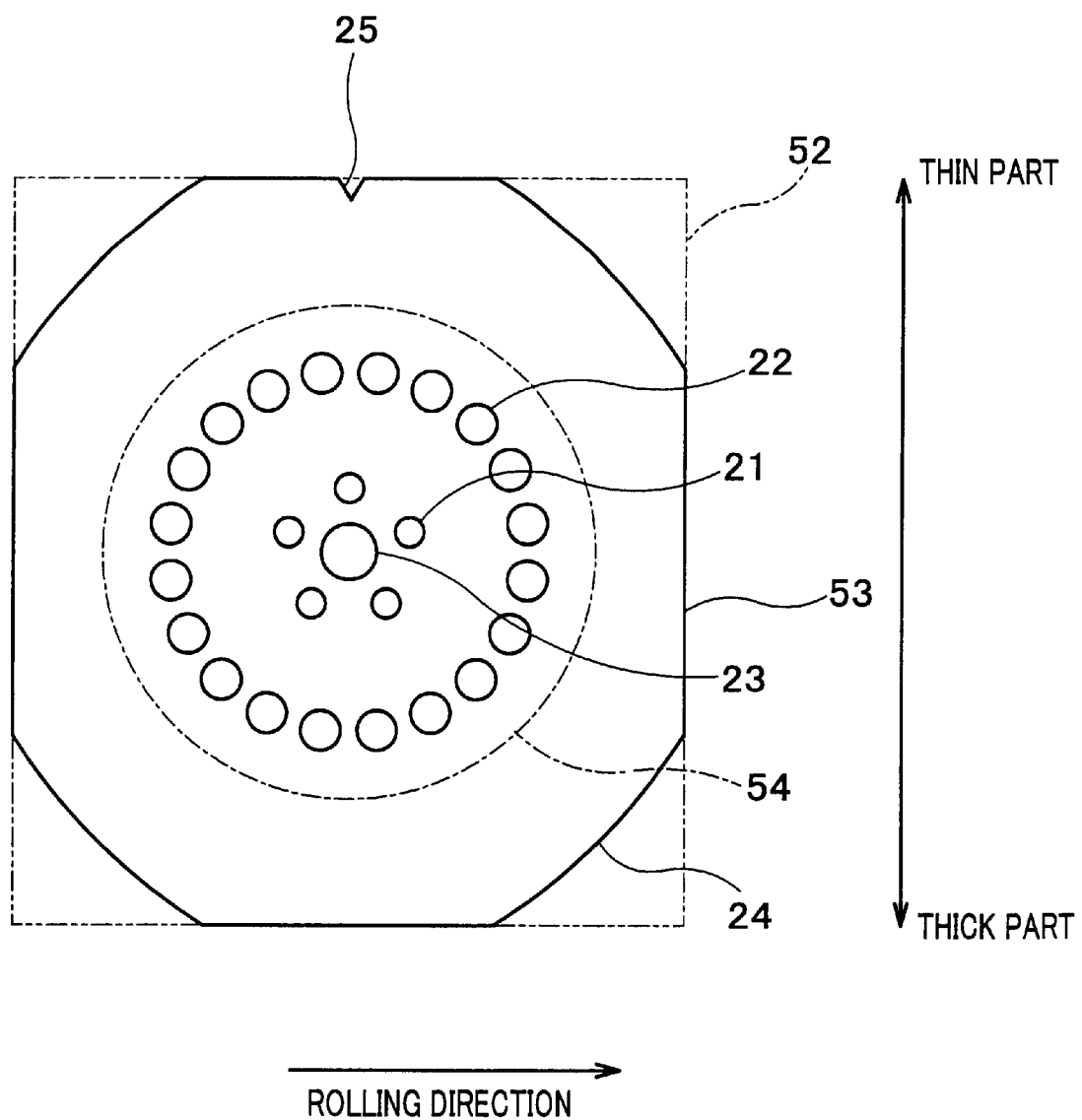
FIG. 3 is a plan view showing the configuration of the disk raw material obtained by punching and cutting a blank.

FIG. 3 is a plan view showing the configuration of a disk raw material 53 obtained by punching and cutting the blank 52. With this FIG. 3, the transverse direction is the rolling direction of the rolled steel plate, and the upper part of this figure is a thin part in which the thickness of a rolled steel plate is thin, and the lower part of this figure is a thick part in which the thickness of the rolled steel plate is thick.

The disk raw material 53 is obtained by performing the following process. First, four corners of the blank 52 having the square shape are cut off in a substantially arcuate shape. Next, the blank 52 is punched so that the bolt insertion holes 21, the ventilation holes 22, and the center hole 23 are formed on the blank 52. Then, a notching 25, which is a mark showing the thin part is formed at the thin part, side of the blank 52. The disk raw material 53 is thus obtained. The disk 2 shown in FIG. 4 is formed by drawing the raw disk material 53 into cup-like configuration at which time the raw disk material is bent as indicated by the imaginary line 54 in FIG. 3. Formation of the bolt insertion holes 21, the ventilation holes 22, and the center hole 23 may be performed after drawing the disk raw material 53 into cup-like configuration. Moreover, the notching 25 used as the mark of the thin part may be formed at the thick part side as a marker showing the thick part.

As described above, any known type of rim may be used as the rim 3 as long as the air valve insertion hole 32 is formed on the rim flange 31, which is located in the external surface side of the vehicle.

The disk 2 is fitted and bonded to the rim 3 by welding the weld parts 24 of the disk 2 to the inner diameter parts of the rim 3 after fitting the disk 2 into the inner diameter of the rim 3. In this case, when the disk 2 is engaged to the rim 3 in the condition that the location of the notching 25, as determined from the center of the disk 2, is made diametrically opposite to the location of the air valve insertion hole 32, the thick part of the disk and the air valve are positioned in the same radial direction.

The wheel 1 thus can be manufactured in the above-described manner. With this wheel 1, the location of the air valve becomes the heaviest point in the condition in which the air valve is attached to the wheel 1, on making the location of the thick part of the disk 2 and the location of the air valve insertion hole 32 of rim 3 overlapped with respect to each other.

The location of the air valve is thus used as marker at the time of adjusting the balance of the tire/wheel assembly after assembling a tire with the wheel 1. Since the location of the air valve and the location of the heaviest point are overlapped with respect to each other, the location of the air valve can be used as the marker in the case of assembling. When the tire is assembled onto the wheel in the condition that the heaviest point of the wheel and the lightest point of the tire are overlapped with respect to each other, for making the mass of balance weight smaller, for example, the location of the air valve thus may be used as the marker.

Figure 5:
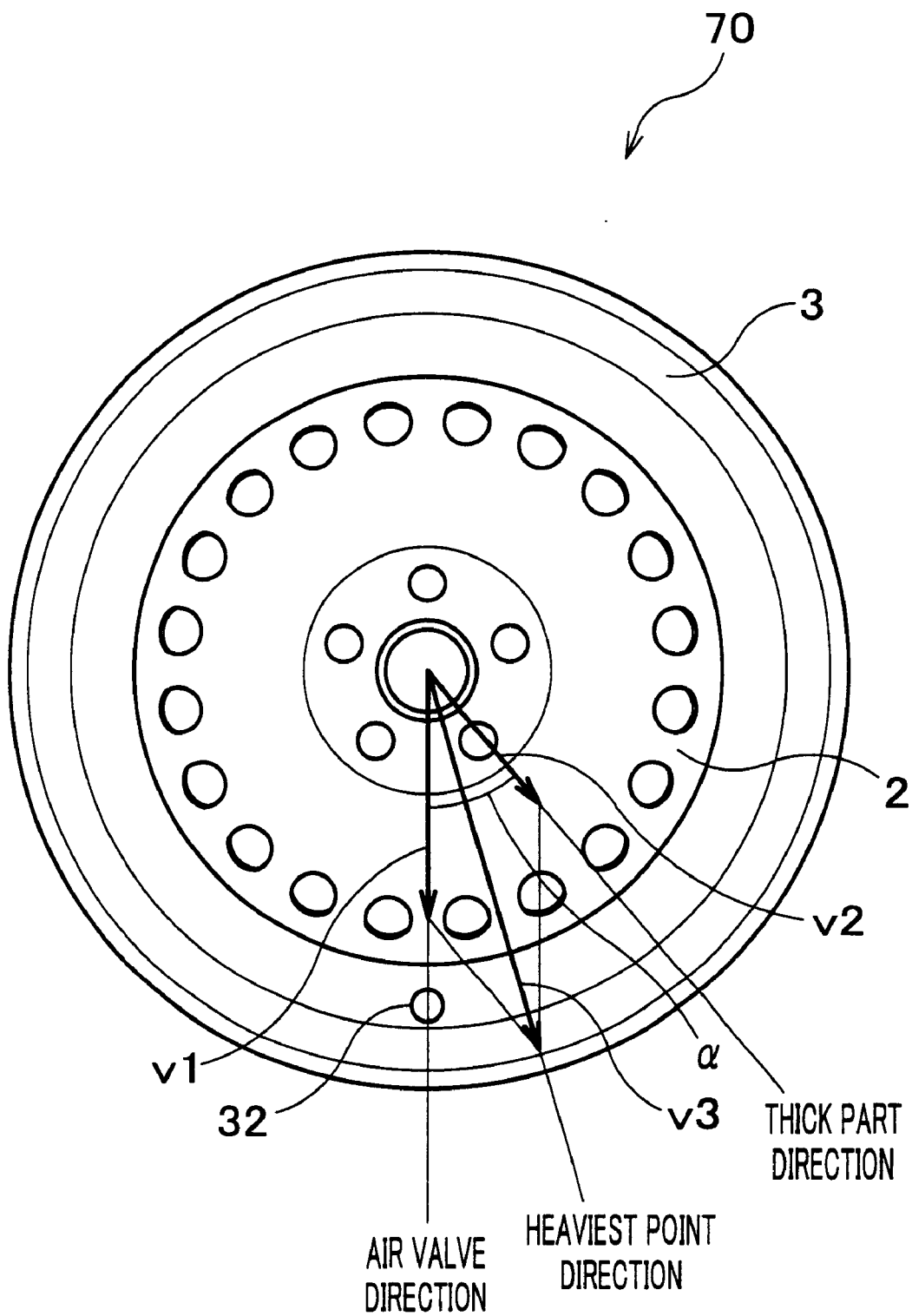
FIG. 5 is a front view of the wheel according to a second aspect of the present invention.

Another preferred embodiment of the present invention will be described below. FIG. 5 is a front view of the wheel according to the another preferred embodiment of the present invention. With the following explanation, the parts that are practically the same as those described in the first preferred embodiment shall be indicated by the same symbols and a detailed description thereof shall be omitted.

With a wheel 70 according to another preferred embodiment of the invention, the rim 3 and the disk 2 are joined, not in the condition that the thick part of the disk 2 and the air valve insertion hole 32 of the rim 3 are overlapped with respect to each other, but in the condition that the air valve is located at a location shifted by an angle α from the location of the thick part of the disk.

In FIG. 5, vector v1 from the center of the disk 2 indicates the unbalance of the rim 3, which extends in the direction of the air valve, and which is caused by the mounting of the air valve into the air valve insertion hole 32. Vector v2 extends from the center of the disk 2 and indicates the unbalance of the disk 2, which extends in the direction of the thick part. By the existence of these two unbalances, the unbalance of the complete wheel, which is equivalent to the vector v3, is obtained by compounding vectors v1 and v2. When engaging the disk 2 to rim 3 so that the location of the thick part of the disk 2 and the location of the air valve insertion hole 32 of the rim 3 may become suitably angularly positioned, and then fix the disk 2 and the rim 3 to each other by welding, the wheel having the desired unbalance thus can be manufactured.

When the wheel, which has the same angle between the low point location and the heaviest point location as determined from the center of the wheel as the angle between the RFV location and the lightest point location of the tire, is chosen from a plurality of prepared wheels from which angles a differ, for example every 10 degrees, and then assembling the tire, the balance weight required to be attached to the wheel for balance adjustment can be made smaller. Thus the appearance of the wheel can be improved.

The preferred embodiments of the present invention are described above. The present invention is not restricted to the above-described embodiments. It cannot be overemphasized that a design change is possible suitably within the scope of the meaning of the invention. This invention is also not limited to the form of the above-mentioned implementation.

As an application of the present invention, for example, other techniques, such as the devices which change the weight balance of the disk or rim for adjusting the balance of tire/wheel assembly, may be combined with the present invention.

As described above, the following remarkable advantages may be obtained with the present invention.

With the present invention, since the wheels having the desired balance may be obtained by suitably combining the unbalance caused by the thick part of the disk with the unbalance caused by the air valve, the balance of the wheel may be adjusted by a minimum of adjusting operations.

With other aspects of the present invention, since the direction of the air valve of the wheel serves as the heavy point, the air valve is used as the marker showing the heavy point at the time of assembling the tire onto the wheel. Then an improved efficiency of the balance weight-attaching operations can be attained.

With the assembling method of the present invention, the wheel having the desired balance may be obtained by suitably assembling the unbalance caused by the thick part of the disk with the unbalance caused by the air valve.

With other assembling methods of the present invention, since the location of the thick part which is the heaviest location of the disk in accordance with the location of the air valve, the wheel in which the location of the air valve surely becomes the heaviest point may be obtained.

With the method for adjusting the balance of wheel, balance of the wheel may be adjusted by combining the unbalance of the disk with the unbalance of the air valve attached to the rim.

What is claimed is:

1. A wheel having a disk with a graduated transverse thickness from a thick part at one side to a thin part at the opposite side, the wheel including an air valve insertion hole disposed at a predetermined angle location with respect to the thick part of the disk as measured from the center of the disk.

2. A wheel having a disk with a graduated transverse thickness from a thick part at one side to thin part at the opposite side, wherein the thick part of the disk measured from the center of the disk and a location on the wheel of an air valve insertion hole are overlapped.

3. A method for manufacturing a wheel in which a rolled plate of varying transverse thickness is used, the method comprising the steps of:

forming a disk to provide a thick part at one side of the disk to a thin part at the opposite side thereof; and attaching the disk to a wheel rim in a condition that the thick part of the disk, as measured from the center of the disk, is disposed in predetermined angular relation with respect to an air valve insertion hole in the wheel rim.

4. A method for manufacturing a wheel in which a rolled plate of varying thickness is used, the method comprising the steps of:

forming a disk to provide a thick part at one side of the disk to a thin part at the opposite side thereof; and attaching the disk to a wheel rim in a condition that the location of the thick part of the disk measured from the center of the disk and a location of an air valve insertion hole are overlapped.

5. A method for adjusting the balance of a wheel having a wheel rim fixed to a disk having a graduated transverse thickness from a thick part at one side of the disk to a thin part on the opposite side thereof, the method including the step that:

the wheel rim is fixed to the disk in the condition that an air valve insertion hole on the rim is disposed at a predetermined shifted angle from a location of the thick part of the disk as measured from the center of the disk.

6. A wheel comprising:

a disk formed by the drawing of a plate obtained from dividing in the rolling direction a rolled plate of graduated transverse thickness from a thick part at one side of the disk to a thin part on the opposite side thereof into a plurality of plates; and a wheel rim, having an air valve insertion hole, wherein said disk is attached to said wheel rim so that said air valve insertion hole is disposed at a predetermined angle location with respect to the thick part of said disk as measured from the center of the said disk.

7. A wheel according to claim 6, wherein a notch is provided at one of the thin part and the thick part of said disk.

8. A wheel comprising:

a disk formed by the drawing of a plate obtained from dividing in the rolling direction a rolled plate of varying transverse thickness from a thick part at one side of the disk to a thin part on the opposite side thereof; and a wheel rim having an air valve insertion hole, wherein said disk is attached to said wheel rim so that the thick part of said disk measured from the center of said disk and a location on said wheel rim of said air valve insertion hole are overlapped.

9. A wheel according to claim 8, wherein a notch is provided at one of the thin part and the thick part of said disk.

10. A method for manufacturing a wheel according to claim 3, further comprising:

providing a notch at one of the thin part and the thick part of said disk.

11. A method for manufacturing a wheel according to claim 4, further comprising:

providing a notch at one of the thin part and the thick part of said disk.

* * * * *